United States Patent [19]

Fulton et al.

[11] 4,367,148

[45] Jan. 4, 1983

[54] METHOD OF AND APPARATUS FOR SEPARATING LIQUID FROM SOLIDS ENTRAINED THEREIN

[75] Inventors: Robert Fulton, Maidenhead; George Walker, Staines, both of England

[73] Assignee: Flakt Aktiebolag, Nacka, Sweden

[21] Appl. No.: 247,139

[22] Filed: Mar. 24, 1981

[51] Int. Cl.³ .............................................. C02F 1/24
[52] U.S. Cl. .................................. 210/703; 210/744; 210/115; 210/221.2; 55/228; 55/DIG. 46; 55/513
[58] Field of Search .............................. 210/703–707, 210/744, 776, 801, 109, 115, 221.2, 513, 519, 520, 525; 55/228, DIG 46

[56] References Cited

U.S. PATENT DOCUMENTS

| | | | |
|---|---|---|---|
| 3,168,031 | 2/1965 | Wilhelmsson et al. | 210/800 |
| 3,341,016 | 9/1967 | Paasche | 210/801 |
| 3,353,679 | 11/1967 | Hirsch | 210/253 |
| 3,762,169 | 10/1973 | Graham | 210/776 |
| 3,764,013 | 10/1973 | Eisenmann | 210/221.2 |
| 3,809,240 | 5/1974 | Savall | 210/703 |
| 3,972,814 | 8/1976 | Paszyc | 210/801 |
| 4,011,164 | 5/1977 | McGivern | 210/776 |
| 4,038,185 | 7/1977 | Kline | 210/776 |
| 4,100,066 | 7/1978 | Bloomer | 210/776 |
| 4,235,711 | 11/1980 | Koblanski | 210/801 |
| 4,290,886 | 9/1981 | Takakuwa | 210/221.2 |

FOREIGN PATENT DOCUMENTS

| | | | |
|---|---|---|---|
| 232932 | 4/1964 | Austria | 210/221.2 |
| 637399 | 5/1950 | United Kingdom | 210/800 |
| 845413 | 8/1960 | United Kingdom | 210/800 |
| 927912 | 6/1963 | United Kingdom | 210/800 |
| 1391032 | 4/1975 | United Kingdom | 210/800 |
| 1491324 | 11/1977 | United Kingdom | 210/800 |
| 1541293 | 2/1979 | United Kingdom | 210/800 |
| 281411 | 9/1967 | U.S.S.R. | 210/744 |

Primary Examiner—Ernest G. Therkorn
Attorney, Agent, or Firm—Dann, Dorfman, Herrell and Skillman

[57] ABSTRACT

The invention relates to a method of and apparatus for separating liquid from solids entrained therein, which solids, preferably paint particles emanating from a paint spray booth are capable of floating on the liquid. The liquid and solids are entrained in a collector which is open to atmosphere and in which a Coanda - type flow prevails so that the solids are collected as a skin on the surface of the liquid. In one embodiment the level of the liquid is raised so that the skin slips over a lip and out of the collector, leaving the liquid behind; in another embodiment the skin is collected behind a restraining device which is moved to allow the skin to flow through an outlet therefor, again leaving the liquid behind.

13 Claims, 4 Drawing Figures

METHOD OF AND APPARATUS FOR SEPARATING LIQUID FROM SOLIDS ENTRAINED THEREIN

FIELD OF THE INVENTION

The invention relates to a method of and apparatus for separating liquid from solids entrained therein, which solids are capable of floating on the liquid.

PRIOR ART

The solids may in particular be paint particles such as waste paint solids which emanate from a paint spraying booth and which are carried from that booth by an aqueous medium in which they are entrained. It will however by understood that the invention is applicable to the separation of a liquid and any solid which is entrained in the liquid and is floatable thereon.

The removal of paint solids from water from a paint spray booth has become increasingly important as environmental and energy demands rise because the paint particles can foul drains and prevent their efficient operation and also have required a large volume of water to carry them from the paint spraying booth. The large volume of water requires considerable energy consumption both for transporting it and for cleaning it of paint particles prior to recirculation or discharge.

SUMMARY OF THE INVENTION

It is an object of the invention to provide a method of and apparatus for separation of solids from a liquid in which they can float, which seeks to avoid the disadvantages of the prior art.

According to one aspect of the invention there is provided a method of separating liquid from solids entrained therein, the solids being capable of floating on the liquid, comprising the steps of providing a collector which has an inlet for the liquid and entrained solids, an outlet for the solids, and an outlet for the liquid, flowing the liquid and entrained solids through the collector from the inlet so that the solids separate from the liquid and float on its surface, and regulating the flow of liquid through the liquid outlet so that when the flow therethrough is decreased the liquid level rises and the floating solids flow from the collector via the solids outlet.

According to a second aspect of the invention there is provided a method of separating liquid from solids entrained therein, the solids being capable of floating on the liquid, comprising the steps of:
(a) providing a collector which has an inlet for the liquid and entrained solids;
(b) an outlet for the solids;
(c) an outlet for the liquid;
(d) flowing the liquid and entrained solids through the collector from the inlet so that the solids separate from the liquid and float on the surface thereof; and
(e) permitting a sufficient desired amount of solids to collect on said liquid surface while restraining it in the collector, and then permitting that desired amount to exit said collector through said solids outlet.

According to a third aspect of the invention there is provided apparatus for separating liquid from solids entrained therein, which solids are floatable on the liquid, comprising a collector having an inlet for liquid and entrained solids, an outlet for the solids, an outlet for liquid, and a device for controlling flow of liquid through the outlet therefor and which is operable to increase the liquid level in the collector so that the floating solids flow from the collector via the solids outlet.

According to a fourth aspect of the invention there is provided a method of separating liquid from solids entrained therein, the solids being capable of floating on the liquid, comprising the steps of:
(a) providing a collector which has an inlet for the liquid and entrained solids;
(b) providing an outlet for the solids;
(c) providing an outlet for the liquid;
(d) providing a restraining device for the solids;
(e) flowing the liquid and entrained solids through the collector from the inlet so that the solids separate from the liquid and float in its surface; and
(f) allowing the solids to flow from the liquid through the solids outlet by removing the restraining device.

According to a fifth aspect of the invention there is provided apparatus for separating liquid from solids entrained therein, which solids are floatable on the liquid, comprising:
(a) a collector;
(b) an inlet of the collector for liquid and entrained solids;
(c) an outlet of the collector for the solids;
(d) an outlet of the collector for liquid;
(e) a restraining device for the solids; and
(f) said restraining device being movable to allow floating solids to flow from the collector through said outlet of the collector for the solids.

A technological advantage obtainable using the invention is that no mechanical means is required to remove the solids from the surface of the liquid, and that a Coanda-type flow can be induced from the inlet to the solids outlet.

The device for controlling the flow of liquid through the liquid outlet may preferably be a liquid flow control valve which is operable to decrease or increase the size of the outlet as desired. One relatively simple construction of the device is a balanced flow control valve.

The solids outlet may preferably be at a position opposite the base of the collector, the liquid and solids inlet and the liquid outlet being at the base of the collector. This provides a relatively simple construction and can provide as long a flow path as possible from the inlet to the solids outlet to enhance solids separation.

The collector may have walls which decrease in spacing from the solids outlet towards the base. This construction helps to prevent solids settling on the walls and also helps to release the floating solids from the liquid.

The liquid and solids inlet and the liquid outlet are preferably adjacent one another at the base of the collector. This provides an arrangement whereby where the respective inlet and outlet is a duct, the ducts can lie side by side.

The liquid and solids inlet may be directed so that initial flow of the liquid and entrained solids may be substantially parallel to the base of the collector. This construction can assist in the establishment of the Coanda-type flow.

The apparatus may include means such as a gas, say air, jet, nozzle or a wave maker adapted to urge the floating solids through the solids outlet. This construction is such as to help to maintain the liquid in the collector so that as little as possible is lost therefrom when the solids are removed.

The apparatus may include a plurality of adjacent collectors, each liquid and solids inlet being connectible to a common supply duct and each liquid outlet being connectible to a common outlet duct. This construction enables a plurality of collectors, or separation compartments, to be assembled each being capable of holding a desired, manageable, volume of liquid to be separated from entrained solids.

The restraining device may be lip of a wall of the collector which is movable, preferably by pivoting, and which in one position blocks the solids outlet and in another position allows solids to flow through the outlet.

The restraining device may be a member which is movable between one position in which it closes the solids outlet, and another position which allows solids to flow through the outlet.

Embodiments of the invention are hereinafter described, by way of example, with reference to the accompanying drawings.

BEST MODES FOR CARRYING OUT THE INVENTION

Figure 1:
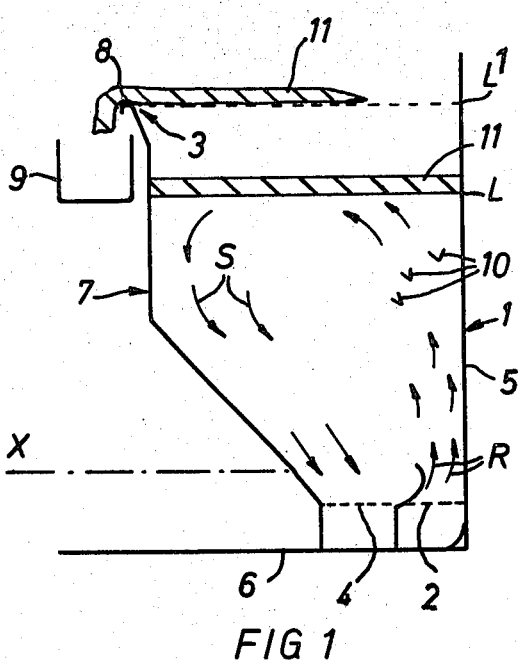
FIG. 1 is a schematic side elevational view of one embodiment of apparatus according to the invention.

Referring to the drawings, in which like parts are indicated by like reference numerals, FIG. 1 shows apparatus comprising a collector 1 which has an inlet 2 for liquid and entrained solids, an outlet 3 for solids which float on the liquid in the collector 1, and an outlet 4 for liquid from which solids have been separated. The outlet 4 is in the form of a duct and there is a device (not shown in FIG. 1) in the form of a liquid flow control valve for controlling flow of liquid through the outlet 4.

The inlet 2 is directed toward an upstanding wall 5 of the collector 1 which also has a base 6 and an upstanding wall 7 opposite the wall 5, the spacing between the walls 5 and 7 decreasing downwardly as viewed, thereby reducing the volume of the collector 1 and hence saving on liquid.

The walls 7 and 5 also taper apart slightly at the top as viewed and side walls (not shown) of the collector at right angles to the walls 5 and 7 and connecting them are tapered slightly from the wall 5 to the wall 7.

The solids outlet 3 comprises a lip 8 at the top of the wall 7.

The collector 1 is open at all times and so is at atmospheric pressure. There is a container 9 in the form of a plastics bag positioned below the lip 3. Also, there are baffles or deflector plates 10 in the collector 2 to direct the flow upwardly along the wall 5, across the surface of the body of liquid in the collector and downwardly along the wall 7.

The operation of the apparatus will now be described, on the assumption that the liquid is an aqueous medium and the entrained solids are paint particles, the medium and solids being delivered from a paint spraying booth and the inlet 2 being connected to an outlet of the booth (which is not shown).

The aqueous medium and entrained paint particles enter the apparatus through the inlet 2 adjacent the wall 5, and flow upwardly in the direction of the arrow R in a Coanda-type flow along that wall. The Coanda flow provides a downflow of aqueous medium in the collector (the running level of the medium outside the collector being shown at X), the speed of the downflow being high enough to reduce induction of paint particles downwardly, from the inlet stream. The inlet flow increases the turbulence and agglomerates the paint particles which form a floating skin 11 on the surface of the aqueous medium the skin 11 being restrained in the collector below the outlet 3. The flow of medium is from right to left as viewed in FIG. 1 and as the flow turns downwardly as shown by the arrows S it loses speed and then passes to the outlet 4. The valve device is adjusted so that the level is as shown at L. When enough paint has been agglomerated or collected, the flow control device is operated to close the area of the outlet 4, so reducing flow therethrough. The inlet volume is constant, so there is an increase in the volume of liquid in the collector. The level L therefore rises until the skin 11 is level with the outlet 3, at L', shown by a dashed line. The skin 11 slips over the lip 3 into the container 9. The liquid flow from right to left as viewed assists in this, as does the taper of the collector 2 from the wall 5 to the wall 7.

When the skin 11 is floated off, the flow control valve is opened again to release the aqueous medium which returns to its former level L for formation of a new skin 11.

The container 9 can be removed by lifting tackle (not shown).

Figure 2:
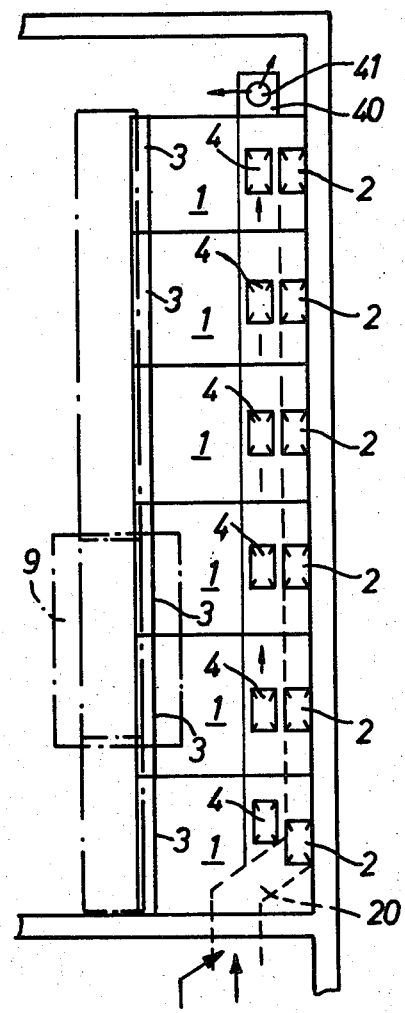
FIG. 2 is a plan view of a plurality of apparatuses as shown in FIG. 1.

Referring now to FIG. 2 there is a plurality of collectors 1, in this case six, arranged in series, and each having an inlet 2 and a liquid outlet 4. The respective inlets 2 are connected to a common supply duct 20 and the respective liquid outlets are connected to a common outlet duct 40. A valve device controlling the level in the collectors is shown at 41, that is at the downstream end of the duct 40. The solids outlet 3 for each collector leads to a common container for the paint 9.

Each collector has a right to left (as viewed) taper to give a better "slip" of the skin 11 and an upward taper to provide a release of the skin, as in the collector of FIG. 1.

Figure 3:
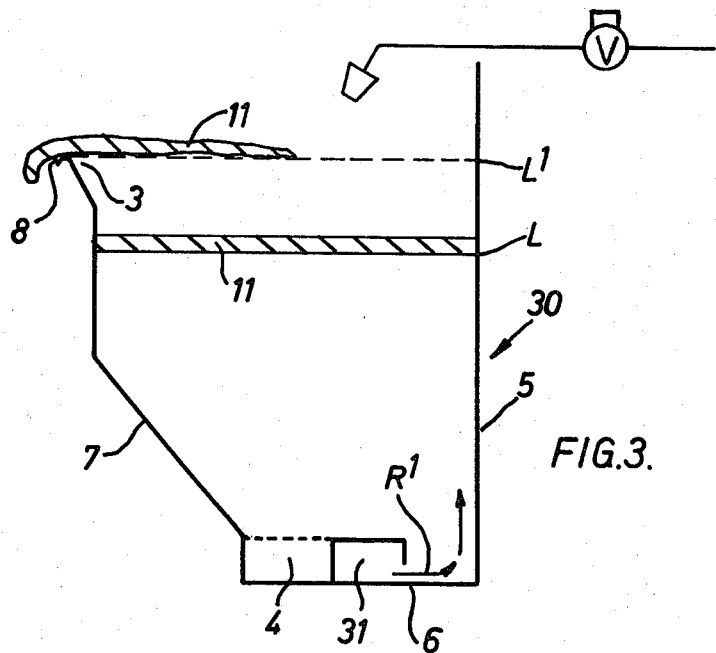
FIG. 3 is a schematic side elevational view of a second embodiment of apparatus according to the invention.

Referring now to FIG. 3, the collector 30 shown is similar to that of FIG. 1 except that the inlet 31 provides a flow substantially parallel to the base 6 of the collector 30 as shown by the arrow R'. This helps the formation of a Coanda column adjacent the wall 5. In all other respects the collector of FIG. 3 is similar to that of FIG. 1 so the identical reference numerals are used for similar features.

Figure 4:
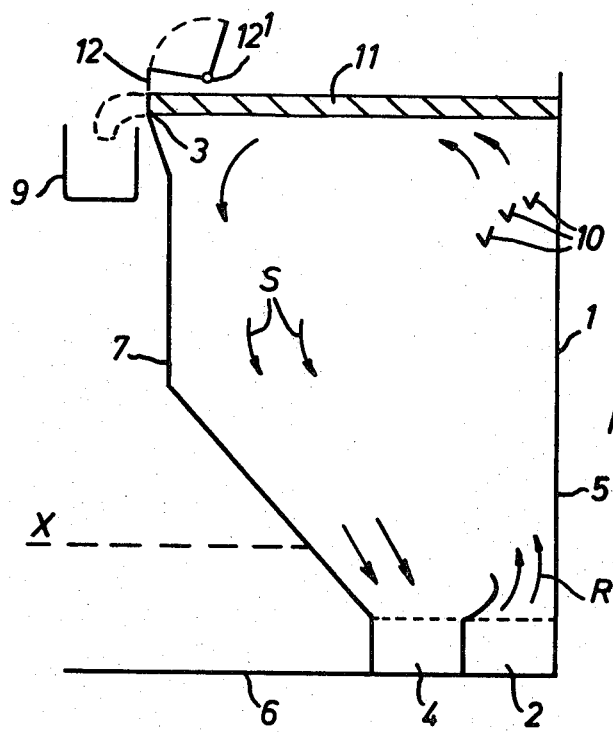
FIG. 4 is a schematic side elevational view of a third embodiment of apparatus according to the invention.

Referring to FIG. 4, there is shown apparatus comprising a collector 1 which has an inlet 2 for liquid and entrained solids, an outlet 3 for solids which float on the liquid in the collector, and an outlet 4 for liquid from which solids have been separated. The outlet 4 is in the form of a duct and there is a device (not shown in the figure) in the form of a liquid flow control valve for controlling flow of liquid through the outlet 4.

The inlet 2 is directed to a wall 5 of the collector which also has a base 6 and a wall 7 opposite the wall 5, the spacing between the walls 5 and 7 decreasing downwardly as viewed, so reducing the volume of the collector 1 and hence saving on liquid.

The walls 7 and 5 also taper apart slightly at the top as viewed and side walls (not shown) of the collector at right angles to the walls 5 and 7 and connecting them are tapered slightly from the wall 5 to the wall 7.

The solids outlet 3 comprises a lip at the top of the wall 7. There is a restraining device 12 in the form of a sluice-type gate which is pivotable about an axis 12' from the one position shown in solid lines when the outlet 3 is closed to another position, shown in dashed lines, when the solids outlet 3 is open.

The collector 1 is open at all times and so is at atmospheric pressure. There is a container in the form of a plastics bag 9 positioned below the lip 3. Also, there are baffles or deflector plates 10 in the collector 1.

The operation of the apparatus will now be described, on the assumption that the liquid is an aqueous medium and the entrained solids are paint particles, the medium and solids being delivered from a paint spraying booth and the inlet 2 being connected to an outlet of that booth (which is not shown).

The aqueous medium and entrained paint particles enter the apparatus through the inlet 2 adjacent the wall 5, and flow upwardly in the direction of the arrows R in a Coanda-type flow along that wall. The Coanda flow provides a downflow of aqueous medium in the collector (the running level of the medium outside the collector being shown at X), the speed of the downflow being high enough to reduce induction of paint particles downwardly, from the inlet stream. The inlet flow increases the turbulence and agglomerates the paint particles which form a floating skin 11 on the surface of the aqueous medium. The flow of medium is from right to left as viewed, and as the flow turns downwardly as shown by the arrows S it loses speed and then passes to the outlet 4. The upper level (as viewed) of the liquid medium is at the lip of the wall 7 defining the solids outlet 3. The paint solids agglomerate and form the skin 11 behind the restraining device 12, which prevents their flow through the solids outlet. When enough paint has been agglomerated, the restraining device 12 is pivoted about axis 12' to the dashed line position shown. There is now nothing restraining the skin 11 and it slips through the outlet 3 over the lip into the container 9. The liquid flow from right to left as viewed assists in this, as does the taper of the collector 12 from the wall 5 to the wall 7.

When the skin 11 is floated off, the restraining device 12 is returned to its full line position shown.

It will be understood that movement of the restraining device about the axis 12' is effected by a lever system, not shown, outside the collector.

The container 9 can be removed by lifting tackle (not shown).

It will be understood that the apparatus above described and shown in the drawings may be modified. For example, the baffles 10 shown in FIG. 1 to slow the flow of the Coanda column may be dispensed with, or they may be movably mounted so that they can be swung out of the column for cleaning. Also, there may be means such as an air jet (shown diagrammatically in FIG. 3); or a wavemaker to act on the skin 11 and urge it over the lip into the container. Where a wave maker is used, a sinusoidal type surface is obtained which helps the passage of the skin over the lip and provides that only a periodic "wave" reaches the lip, so reducing liquid loss.

In every embodiment, separated solids float on the liquid and are floated therefrom, and very little of the liquid is transferred with it. Also, in every embodiment it is merely the flow of liquid which is regulated, so altering the level of the skin 11 as required, for removing or forming the skin, and so ensuring a constant pressure in the liquid at all times at the skin.

In every embodiment an aerated pressurized liquid such as water may be injected into the supply duct 20 in the flow of liquid to be cleaned upstream of the inlet 2, before the liquid to be cleaned enters the collector 1. This agitates the liquid to be cleaned and enhances separation of the paint therefrom to form the skin 11.

We claim:

1. A method of separating liquid from solids entrained therein, the solids being capable of floating on the surface of the liquid, comprising the steps of:
   (a) providing opposed upstanding walls closed at the base and open at the top to define a collector which is open to atmosphere at all times and has an inlet for the liquid and entrained solids;
   (b) an outlet for the solids at the open top of said collector; and
   (c) an outlet for the liquid;
   (d) creating a body of liquid in said collector having an upper surface open to atmosphere adjacent the open top thereof below the outlet for solids, flowing the liquid and entrained solids through the collector from the inlet in a flow which is upwardly adjacent one of said upstanding walls along said upper surface and downwardly adjacent the opposed upstanding wall so that the solids separate from the liquid and float on its surface; and
   (e) regulating the flow of liquid through the liquid outlet so that when the flow therethrough is decreased the level of said upper surface rises and the floating solids flow from the collector via the solids outlet.

2. A method according to claim 1, wherein the step of regulating the flow of liquid through the liquid outlet comprises adjusting the size of the opening of said outlet through which liquid can flow.

3. Apparatus for separating liquid from solids entrained therein, which solids are floatable on the liquid, comprising:
   (a) a collector having opposed upstanding walls closed at the base and open at the top;
   (b) an inlet for liquid and entrained solids to cause the same to flow upwardly adjacent one of said upstanding walls;
   (c) an outlet for the solids at the open top of said collector;
   (d) an outlet for liquid to cause the same to flow downwardly adjacent the opposite upstanding wall; and
   (e) a device controlling flow of liquid through the liquid outlet to cause the liquid in said collector to have an upper surface adjacent the open top of said collector below said solids outlet, and operable to raise the level of said surface in the collector so that floating solids flow from the collector via the solids outlet at the open top of said collector.

4. Apparatus according to claim 3, wherein the flow-control device comprises a liquid flow control valve.

5. Apparatus according to claim 4, wherein the liquid and solids inlet and the liquid outlet are adjacent the closed base of the collector.

6. Apparatus according to claim 5, wherein the liquid and solids inlet and the liquid outlet are adjacent one another at the base of the collector, said liquid and solids inlet having means directing the flow of liquid and solids against said one upstanding wall.

7. Apparatus according to claim 4, wherein the upstanding walls decrease in spacing from the solids outlet towards the closed base.

8. Apparatus according to claim 7, wherein the liquid and solids inlet directing means directs the initial flow of the liquid and entrained solids substantially parallel to the base of the collector.

9. Apparatus according to claim 3, including discharge means to urge the floating solids through the solids inlet upon raising of said surface.

10. Apparatus according to claim 9, wherein the discharge means is a jet nozzle blowing a gas jet onto the solids.

11. Apparatus according to claim 10, including means to supply air to said nozzle, said gas jet being an air jet.

12. Apparatus according to claim 9, wherein the discharge means is a wave maker.

13. Apparatus according to claim 3, wherein there is a plurality of adjacent collectors, and including a common supply duct connected to each liquid and solids inlet and a common outlet duct connected to each liquid outlet.

* * * * *

UNITED STATES PATENT AND TRADEMARK OFFICE
CERTIFICATE OF CORRECTION

PATENT NO. : 4,367,148

DATED : January 4, 1983

INVENTOR(S) : Robert Fulton and George Walker

It is certified that error appears in the above-identified patent and that said Letters Patent is hereby corrected as shown below:

Column 5, line 45, "12" should read --1--;
Column 6, line 8, after "2" insert --as indicated by the angular arrow in Fig. 2--.

Signed and Sealed this

Twenty-second Day of March 1983

[SEAL]

*Attest:*

*Attesting Officer*

GERALD J. MOSSINGHOFF

*Commissioner of Patents and Trademarks*